United States Patent
Huang et al.

(10) Patent No.: US 7,275,002 B2
(45) Date of Patent: Sep. 25, 2007

(54) ISLANDING DETECTION AND PROTECTION METHOD

(75) Inventors: Yung-Fu Huang, Ping Tung (TW);
Pao-Chuan Lin, Chu Pei (TW);
Tain-Syh Luor, Yongkang (TW)

(73) Assignee: Industrial Technology Research Institute, Hsinchu County (TW)

( * ) Notice: Subject to any disclaimer, the term of this patent is extended or adjusted under 35 U.S.C. 154(b) by 0 days.

(21) Appl. No.: 11/435,750

(22) Filed: May 18, 2006

(65) Prior Publication Data

US 2007/0143044 A1 Jun. 21, 2007

(30) Foreign Application Priority Data

Dec. 20, 2005 (TW) .................................. 94145302

(51) Int. Cl.
*G01R 21/00* (2006.01)
(52) U.S. Cl. .................. 702/64; 363/56.1; 702/57; 702/58; 702/60
(58) Field of Classification Search .......... 702/64–651, 702/57–58, 60; 361/93.2; 363/56.01
See application file for complete search history.

(56) References Cited

U.S. PATENT DOCUMENTS

| | | | | |
|---|---|---|---|---|
| 5,224,011 A | * | 6/1993 | Yalla et al. | 361/93.2 |
| 5,493,485 A | | 2/1996 | Okado | 363/56.01 |

* cited by examiner

*Primary Examiner*—John Barlow
*Assistant Examiner*—John Le
(74) *Attorney, Agent, or Firm*—Rabin & Berdo, P.C.

(57) ABSTRACT

An islanding detection and protection method of a parallel-type power converter is proposed, which performs perturbation to a power system to detect the frequency of the system voltage and the variation of the magnitude of the negative-sequence voltage as the basis for deciding the occurrence of an islanding operation. When the system operates normally, the frequency or phase and magnitude of the system voltage and the magnitude of the negative-sequence voltage won't be affected by the perturbation. On the other hand, if an islanding operation occurs, this perturbation will cause an apparent drift of the frequency or phase and magnitude of the system voltage and the magnitude of the negative-sequence voltage. Through detection of this apparent drift, the perturbation can be amplified by means of positive feedback to quickly detect the islanding operation phenomenon and trigger the protection mechanism.

16 Claims, 5 Drawing Sheets

ISLANDING DETECTION AND PROTECTION METHOD

BACKGROUND OF THE INVENTION

1. Field of the Invention

The present invention relates to an islanding detection and protection method and, more particularly, to a method of performing perturbation to a power system to quickly detect islanding operation of the power system and trigger the protection mechanism for the power system.

2. Description of Related Art

Liberation of the power industry is the future trend of power development. Small distributed energy or renewable energy generating equipment such as cogeneration systems, solar energy generating systems and wind energy generating systems are usually incorporated into the public power system for parallel operation. When the public power system trips due to an abnormality, if the distributed energy generating equipment cannot detect that the public power system has tripped and still provides power, a stand-alone state will arise to form an islanding zone, which is called an islanding operation.

The key factor is that each distributed energy generating equipment usually belongs to a private owner but is not directly controlled by the power company. Therefore, when the public power system breaks off, if each distributed energy generating equipment cannot detect this situation and still provides power, the voltage and frequency will be unstable which leads to the damaging of electric equipment or even causes electric shock hazards to power maintenance men. Furthermore, when the public power system is restored, the distributed energy generating equipment or electric equipment may be damaged due to asynchronization.

Therefore, there are many documents concerning detection of an islanding operations, many of which are base on detection of the magnitude and frequency of voltage at the point of the common coupling (PCC) terminal of the power system. As shown in FIG. 1, once the voltage or frequency exceeds (beyond or below) the operating window, the distributed power system is disconnected from the public power system to avoid an islanding operation; or the voltage phase of the power system is detected momentarily to detect whether there is a voltage phase jump, representing the occurrence of an islanding operation.

The above methods of detecting voltage, frequency or phase jump are usually restricted by the form of load, and may be unable to detect the state of an islanding operation due to the load state. This is called a non-detection zone (NDZ).

Another method is to detect the total harmonic distortion (THD) of the PCC. When this THD exceeds a preset level, it represents the occurrence of an islanding operation. This method is based on the nonlinear hysteresis of the B-H curve of a transformer. When the power system operates normally, this nonlinear current is provided by the power system and does not affect the voltage harmonics. When the power system trips, this nonlinear current is provided by the distributed power system. At this time, high-order harmonics of voltage will be generated. Therefore, the THD can be used as a base to determine whether an islanding operation is occuring or not.

However, it is difficult to obtain the magnitude of the THD to determine whether an islanding operation has occurred or not. A method of using the power line carrier for direct communication to determine whether islanding operation occurs can also be used. However, it is necessary to simultaneously install communication equipment at both ends, hence causing additional expenses. The above methods are commonly called the passive islanding detection method.

Another important detection method is called the active anti-islanding detection method. For instance, in the detection technique developed by the Sandia National Lab, the frequency or magnitude of the output current of a power regulator is adjusted to perturb the power system, and the frequency or magnitude of the voltage of the power system is detected. When there is any change in the frequency or magnitude of the voltage of the power system, the frequency or magnitude of the output current of the power regulator is varied by means of positive feedback so as to accomplish the object of detecting an islanding operation.

If the power system operates normally, this small component won't affect the magnitude of the voltage. When the power system trips, the produced voltage change will enlarge the voltage drift through positive feedback. Therefore, whether an islanding operation occurs or not can be determined according to whether the voltage exceeds the operating window or not.

Using solar power regulators as an example, when a plurality of solar power regulators is parallel connected, the influences to the voltage drift may easily cancel out one another because a certain one has a smaller sunlight illumination while another has a larger sunlight illumination. Moreover, general solar power regulators operate near the load point with maximum power, but cannot provide a larger output current to perturb the voltage of the power system. Therefore, the phenomenon of an islanding operation is difficult to detect.

Another islanding detection method, called Sandia Frequency Shift (SFS), developed by the Sandia National Lab makes use of a frequency positive-feedback system. As shown in FIG. 2, the current frequency fn2 (E) is a curve equation that describes the relation between an error and an increment/decrement of the frequency.

When the power system operates normally, the change of the current frequency won't cause any drift in the voltage of the power system. If the power system trips, the voltage frequency will drift due to the change in the current frequency. Through positive feedback, the frequency of the output current will increase to exceed the normal operating window (too large or too small). An islanding operation can thus be detected.

With passive components (an inductor, a capacitor and a resistor) as the load, the lag angle is:

$$\arg \tan(R^{-1} + j\overline{\omega}c - j(\overline{\omega}L)^{-1}) \quad (1)$$

From (1), if the operating frequency point is at the resonance point of the inductor and the capacitor, the error angle will be zero, and there is no drift in the frequency of the output current, hence not being able to detect an islanding operation. Furthermore, the detection time is too long to meet standards.

As shown in FIG. 3, U.S. Pat. No. 5,493,485 discloses a protection device for stopping operation of an inverter, which makes use of such factors as current and voltage phase drift, frequency variation, voltage variation and THD variation to determine the phase drift between the output current and voltage. Moreover, the equation describing the relation between frequency and phase difference can be among various kinds of nonlinear functions. Because the decision algorithm is complex, this system is hard to realize.

Additionally, there are some methods making use of the sliding mode of frequency and phase difference to adjust the phase difference between the injected current and the voltage when any drift in the voltage frequency is detected, thereby making the operation point reach another stable point along this sliding curve. This stable point lies outside the normal operating window. This sliding curve is shown in FIG. 4. Similarly, if the operating frequency point is at the resonance point of the inductor and the capacitor, the error angle will be zero, and there is no drift in the frequency of the output current, hence not being able to detect an islanding operation. Furthermore, the detection time is too long to meet standards.

Accordingly, the present invention aims to propose an islanding detection and protection method and system to solve the above problems in the prior art. In the present invention, the magnitude of error is converted to an error differential directional component (S value) and a counter (weighting factor $W_s$). The weighting factor $W_s$ is used to adjust the variation of a negative-sequence current of a distributed power system to avoid the problem that the adjustment diminishes with decrease of the feedback error, thereby accurately and quickly detecting the occurrence of an islanding operation.

SUMMARY OF THE INVENTION

An object of the present invention is to provide islanding detection and a protection method that quickly detects an islanding operation of a power system and triggers a protection mechanism for the power system.

To achieve the above object, the present invention provides an islanding detection and protection method, which comprises the steps of: detecting a plurality of negative-sequence voltage values of a PCC; acquiring a plurality of different negative-sequence voltage values; adding a small negative-sequence current variation to a power system; calculating a drift in the negative-sequence voltage to see if it exceeds (is larger or smaller than) the limit value of the negative-sequence voltage so as to detect an islanding operation.

To achieve the above object, the present invention provides an islanding detection and protection method, in which a current command controller adds a small negative-sequence current variation in each period.

To achieve the above object, the present invention provides an islanding detection and protection method, in which a weighting factor of an error differential directional component counter is designed for prediction of the occurrence probability of an islanding operation. When the weighting factor $W_s$ accumulates to a preset value, an islanding operation does occur even if the negative-sequence voltage does not exceed the limit value, and a trip protection of an islanding operation can be accomplished in a limited time.

To achieve the above object, the present invention provides an islanding detection and protection method, in which the weighting factor can be used to adjust the setting of a negative-sequence current. The larger the weighting factor, the higher the occurrence probability of an islanding operation, and the set variation of negative-sequence current is adjusted to be larger to more quickly accomplish abnormal trip protection of an islanding operation to recover when operation in higher Q factor of LC load condition.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
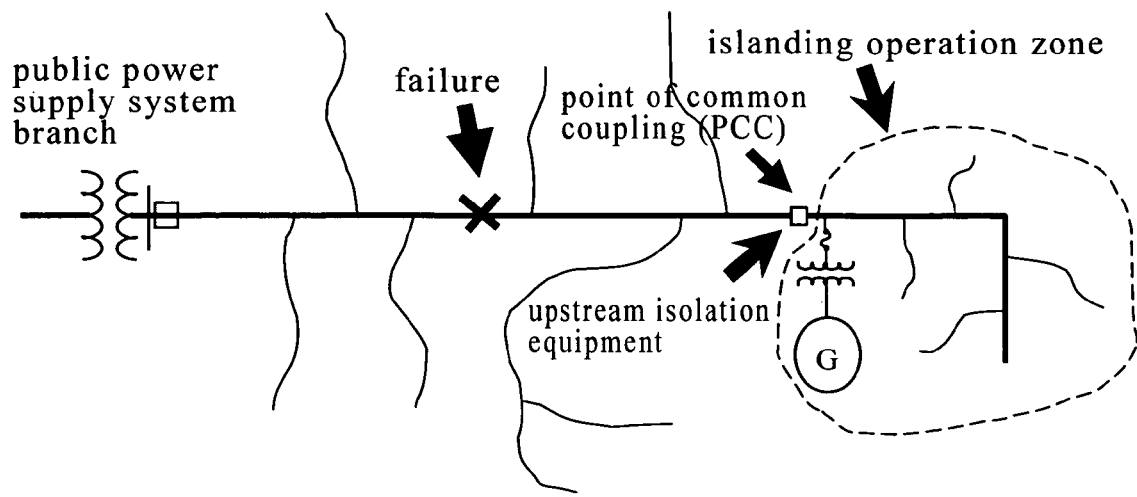
FIG. 1 is an architecture diagram of a conventional power system.
Figure 2:
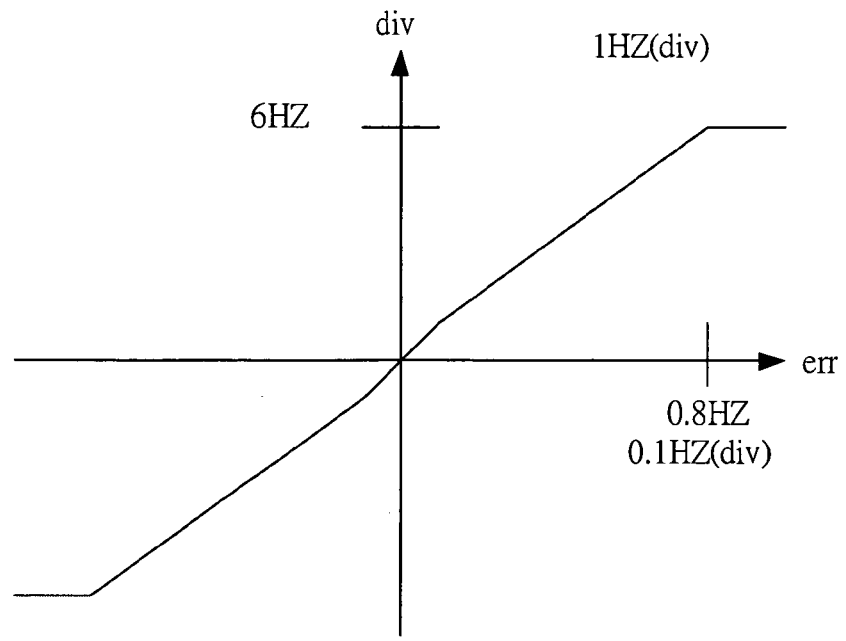
FIG. 2 shows a curve describing the relation between an error and an increment/decrement of the frequency in the prior art.
Figure 3:
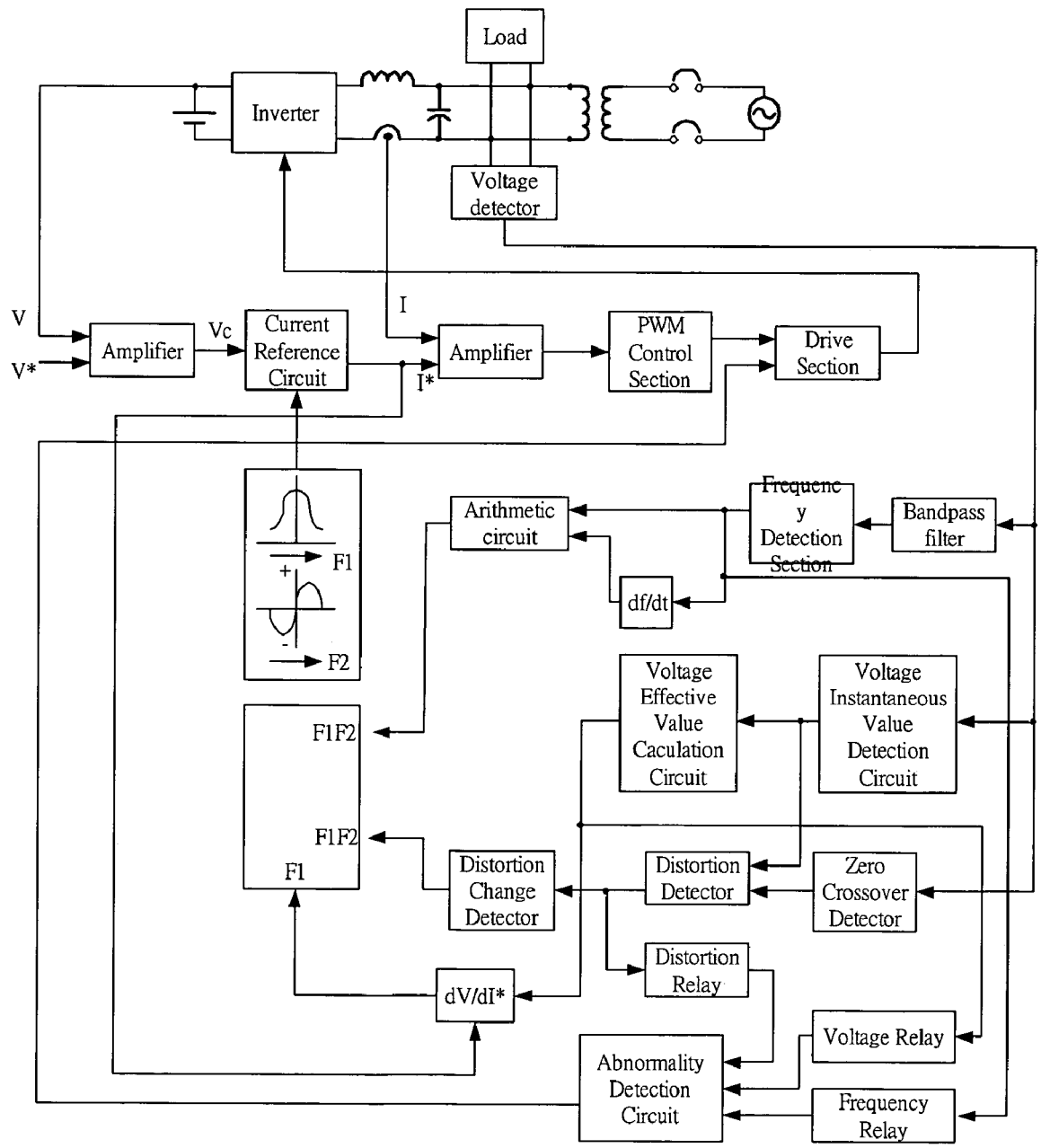
FIG. 3 is a system block diagram of the prior art U.S. Pat. No. 5,493,485.
Figure 4:
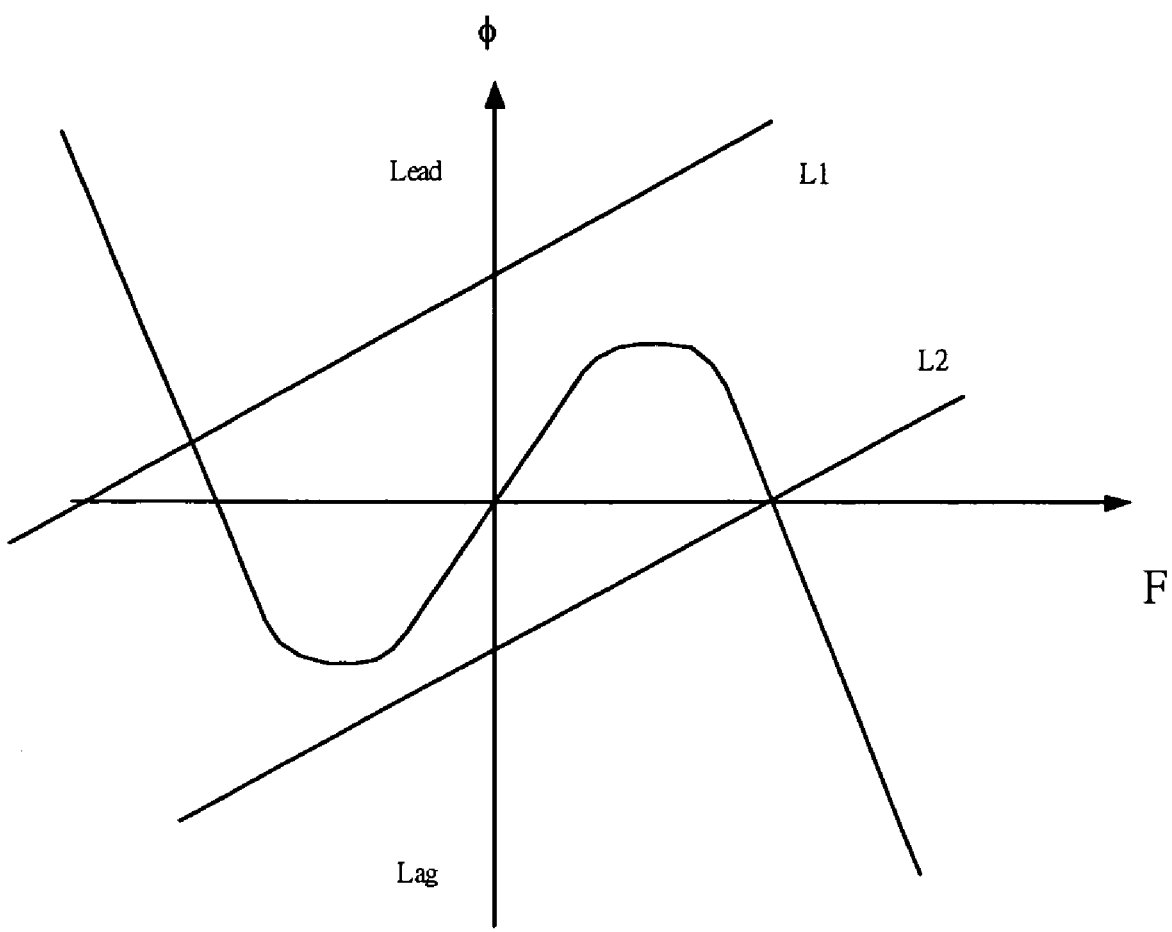
FIG. 4 is a diagram of the conventional sliding mode curve.
Figure 5:
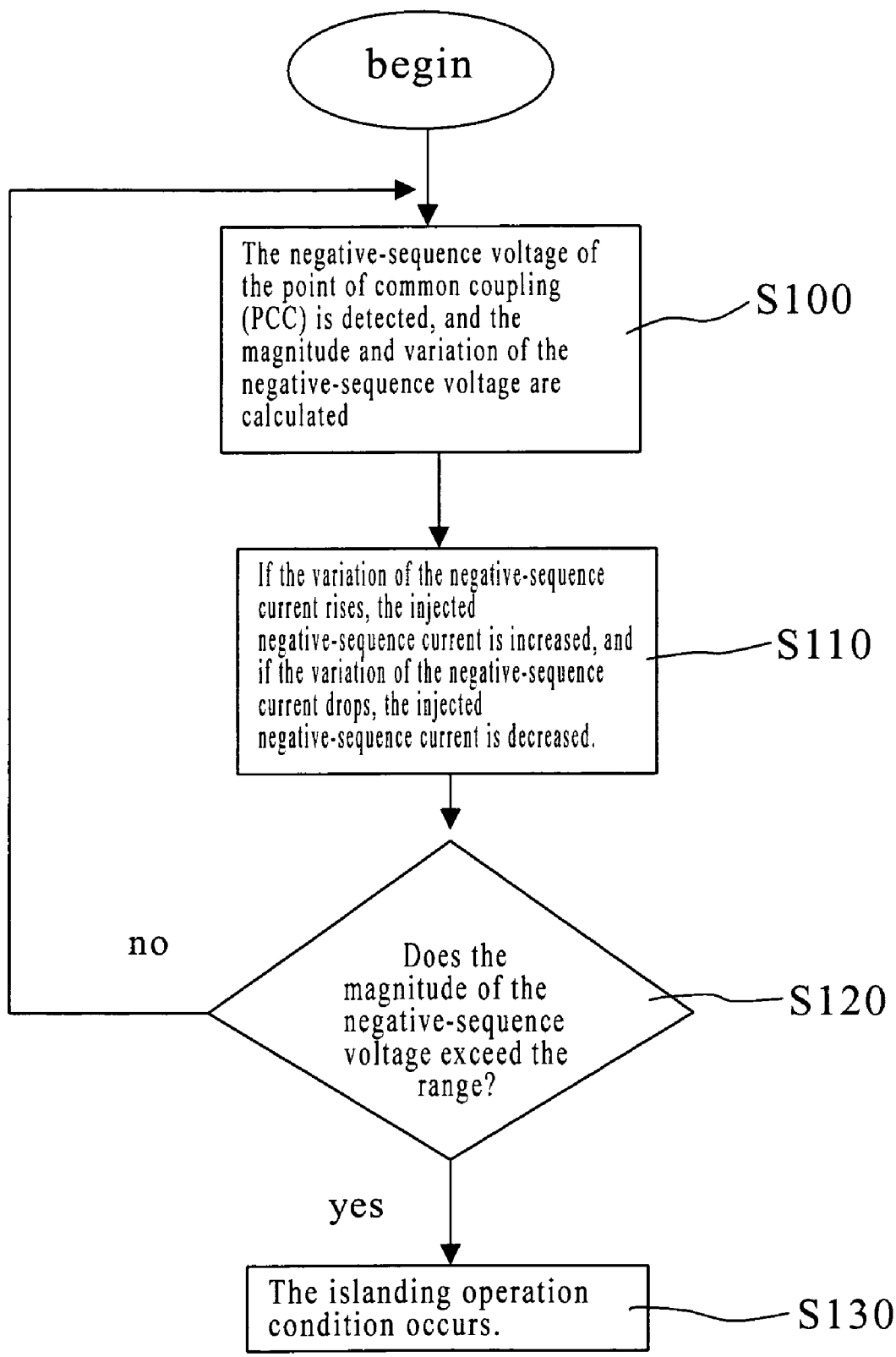
FIG. 5 is a flowchart of an islanding detection method of the present invention.

FIG. 5 is a flowchart of an islanding detection method of the present invention. First, the variation and magnitude of the negative-sequence voltage of a PCC are detected (Step S100). If the power system operates normally, this negative-sequence voltage value is almost constant. Based on this characteristic, when the power system operates normally, the variation of the negative-sequence voltage will be detected as very small. At this time, a current command controller adds a small negative-sequence current variation in a constant period or a variable period. The small negative-sequence current component that is inject for perturbation can be a linear function, an exponential function or a polynomial function relative to the negative-sequence voltage.

When the power system trips, the detected negative-sequence voltage variation depends on the load at that time. When the detected negative-sequence voltage variation is larger, the added small negative-sequence current variation will rise to cause an increase in the negative-sequence voltage variation. The increase of the negative-sequence voltage further compels the added negative-sequence current to become larger (Step S110). Whether the magnitude of the negative-sequence voltage exceeding the limit range is determined (Step S120). Next, the occurrence of an islanding operation is detected (Step S130).

The output negative-sequence current variation can be form as $$\Delta I_k = S \times \Delta I_0 \tag{2}$$

$\Delta I_0$ is a small negative-sequence current variation.

The above S value (error differential directional component) is defined as follows:

$$\Delta V_k - \Delta V_{k-1} > 0 \ldots S=1 \tag{3}$$

$$\Delta V_k - \Delta V_{k-1} = 0 \ldots S=0 \tag{4}$$

$$\Delta V_k - \Delta V_{k-1} < 0 \ldots S=-1 \tag{5}$$

where $\Delta V_k$ is the set output negative-sequence voltage variation in the k-th sampling period, $\Delta I_k$ is the set output negative-sequence current variation in the k-th sampling period.

Figure 6:
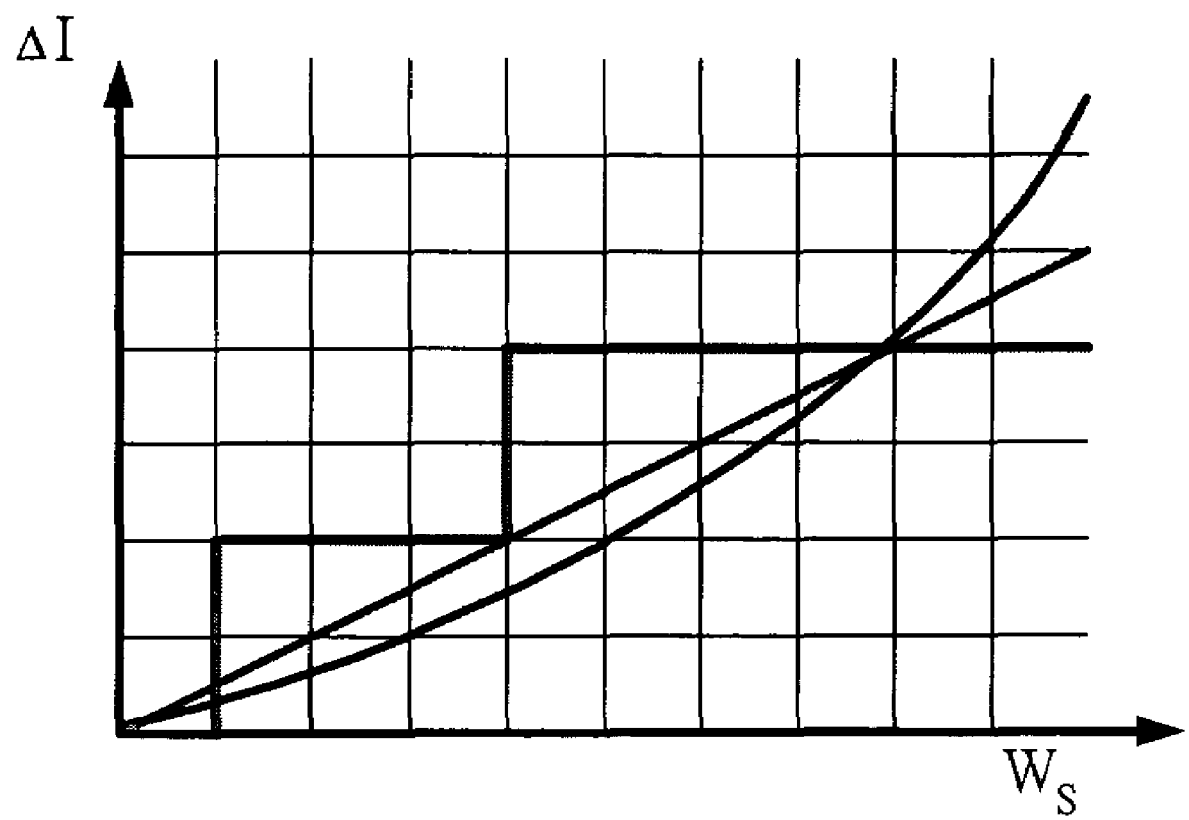
FIG. 6 is a graph of weighting functions of the present invention.

In order to more quickly detect an islanding operation or avoid a situation due to high Q factor of LC load characteristic, a weighting factor $W_s$ can be designed. The weighting factor $W_s$ is used as a counter for calculating the error differential directional component (S value) for prediction of the occurrence probability of an islanding operation. For example, when the S value remains unchanged, the weighting factor $W_s$ is increased by 1 in each sampling period; if the S value changes, the weighting factor $W_s$ is set to 0. In this way, the equation (2) can be modified to be:

$$\Delta I_k = S \times F(W_s) \qquad (6)$$

where the weighting function $F(W_s)$ is shown in FIG. 6 for changing the negative-sequence current variation.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An islanding detection and protection method, comprising the steps of:
    injecting a small negative-sequence current component for perturbation, wherein said small negative-sequence current component that is injected for perturbation can have a constant magnitude;
    detecting a negative-sequence voltage component of a power system; and
    using a counter to calculate the number of times drift occurs in said negative-sequence voltage;
    whereby when said power system trips, said negative-sequence voltage component of the power system is detected to be higher than a preset operating window, and said distributed power system is disconnected to accomplish islanding operation protection.

2. The islanding detection and protection method as claimed in claim 1, wherein said small negative-sequence current component that is injected for perturbation can have a constant period.

3. The islanding detection and protection method as claimed in claim 1, wherein said small negative-sequence current component that is injected for perturbation can have a variable period.

4. The islanding detection and protection method as claimed in claim 1, wherein said small negative-sequence current component that is injected for perturbation can be a linear function relative to said negative-sequence voltage.

5. The islanding detection and protection method as claimed in claim 1, wherein said small negative-sequence current component that is injected for perturbation can be an exponential function relative to said negative-sequence voltage.

6. The islanding detection and protection method as claimed in claim 1, wherein said small negative-sequence current component that is injected for perturbation can be a polynomial function relative to said negative-sequence voltage.

7. An islanding detection and protection method, comprising the steps of:
    injecting a small negative-sequence current component for perturbation;
    detecting a negative-sequence voltage component of a power system;
    using a counter to calculate the number of times drift occurs in said negative-sequence voltage; and
    designing a weighting factor $W_s$ as a counter for calculating a differential directional component S of an error of said negative-sequence voltage according to the formula $\Delta I_k = S \times F(W_s)$, where $\Delta I_k$ is an output negative-sequence current variation and $F(W_s)$ is a weighting function,
    whereby when said power system trips, said negative-sequence voltage component of the power system is detected to be higher than a preset operating window, and said distributed power system is disconnected to accomplish islanding operation protection.

8. The islanding detection and protection method as claimed in claim 7, wherein said small negative-sequence current component that is injected for perturbation can have a constant magnitude.

9. The islanding detection and protection method as claimed in claim 7, wherein an islanding operation occurs when said weighting factor $W_s$ accumulates to a predetermined value, and abnormal trip protection of an islanding operation can be accomplished in a limited time.

10. The islanding detection and protection method as claimed in claim 7, wherein said weighting factor $W_s$ can be used to adjust said negative-sequence current, the larger said weighting factor $W_s$, the higher the probability of an islanding operation, and the larger said injected negative-sequence current is, the more quickly abnormal trip protection of an islanding operation will be accomplished.

11. The islanding detection and protection method as claimed in claim 7, wherein said small negative-sequence current component that is injected for perturbation can have a constant period.

12. The islanding detection and protection method as claimed in claim 7, wherein said small negative-sequence current component that is injected for perturbation can have a variable period.

13. The islanding detection and protection method as claimed in claim 7, wherein said small negative-sequence current component that is injected for perturbation can be a linear function relative to said negative-sequence voltage.

14. The islanding detection and protection method as claimed in claim 7, wherein said small negative-sequence current component that is injected for perturbation can be an exponential function relative to said negative-sequence voltage.

15. The islanding detection and protection method as claimed in claim 7, wherein said small negative-sequence current component that is injected for perturbation can be a polynomial function relative to said negative-sequence voltage.

16. An islanding detection and protection method, comprising the steps of:
    injecting a small negative-sequence current component for perturbation, wherein said small negative-sequence current component that is injected for perturbation can have a constant magnitude;
    detecting a negative-sequence voltage component of a power system;
    using a counter to calculate the number of times drift occurs in said negative-sequence voltage;
    designing a weighting factor Ws as a counter for calculating a differential directional component S of an error of said negative-sequence voltage according to the formula $\Delta I_k = S \times F(W_s)$, where $\Delta I_k$ is an output negative-sequence current variation and $F(W_s)$ is a weighting function, wherein said weighting factor Ws can be used to adjust said negative-sequence current, the larger said weighting factor Ws, the higher the probability of an islanding operation, and the larger said injected negative-sequence current is, the more quickly abnormal trip protection of an islanding operation will be accomplished, or said weighting factor Ws accumulates to a predetermined value, and abnormal trip protection of an islanding operation will be accomplished in a limited time, whereby when said power system trips, said negative-sequence voltage component of the power system is detected to be higher than a preset operating window, and said distributed power system is disconnected to accomplish islanding operation protection.

* * * * *